(12) United States Patent
Van Zyl

(10) Patent No.: US 6,203,280 B1
(45) Date of Patent: Mar. 20, 2001

(54) PUMP TOTALIZER SYSTEM

(75) Inventor: Ian D. Van Zyl, Peterborough (CA)

(73) Assignee: Milltronics Ltd., Peterborough (CA)

( * ) Notice: Subject to any disclaimer, the term of this patent is extended or adjusted under 35 U.S.C. 154(b) by 0 days.

(21) Appl. No.: 08/982,896

(22) Filed: Dec. 2, 1997

(30) Foreign Application Priority Data

Dec. 4, 1996 (GB) .................................................. 9625162

(51) Int. Cl.⁷ .................................................. F04B 49/06
(52) U.S. Cl. .................................. 417/36; 417/53; 417/7
(58) Field of Search .................................. 417/36, 4, 5, 7, 417/12, 53

(56) References Cited

U.S. PATENT DOCUMENTS

| | | | |
|---|---|---|---|
| 4,015,471 | 4/1977 | Marsh | 73/194 |
| 4,083,246 | 4/1978 | Marsh | 73/227 |
| 4,455,870 * | 6/1984 | Jorritsma | 73/223 |
| 4,459,848 | 7/1984 | Huret | 73/431 |
| 4,549,434 | 10/1985 | Marsh | 73/299 |
| 4,608,432 | 8/1986 | Magnus et al. | 528/274 |
| 4,669,308 * | 6/1987 | Jorritsma | 73/223 |
| 4,688,432 | 8/1987 | Marsh | 73/861.15 |
| 4,821,580 | 4/1989 | Jorritsma | 73/861 |
| 5,313,842 | 5/1994 | Marsh et al. | 73/861 |
| 5,385,056 | 1/1995 | Marsh et al. | 73/861 |
| 5,497,664 * | 3/1996 | Jorritsma | 73/861 |
| 5,591,010 * | 1/1997 | Zyl | 417/12 |
| 5,597,960 * | 1/1997 | Beaudoim | 73/861 |
| 5,854,424 * | 12/1998 | Jorritsma | 73/149 |

* cited by examiner

*Primary Examiner*—Timothy S. Thorpe
*Assistant Examiner*—Robert Z. Evora
(74) *Attorney, Agent, or Firm*—Ridout & Maybee

(57) ABSTRACT

A method for totalizing the volume of liquid pumped to or from a vessel by a set of pumps. The method comprises the following steps: Calculating a running time for each of the pumps. Determining a first rate of change of volume when each of the pumps is turned on and a second rate of change a predetermined period after each of the pumps is turned on. Determining a draw down rate for each of the pumps and calculating the volume pumped by each pump based on the running time and draw down rate. Summing the volume pumped by each of the pumps to give a total volume pumped for the vessel over the operating time for the pumps. The totalizing method is incorporated with a control system for controlling the pumping of liquid to or from a vessel using one or more pumps. The control system comprises a level sensor, an actuator for each of the pumps, and a controller. The controller is programmed to issue control signals to the actuators and execute process steps for totalizing the volume of liquid pumped in the vessel.

4 Claims, 2 Drawing Sheets

PUMP TOTALIZER SYSTEM

FIELD OF THE INVENTION

This invention relates to systems for determining the volume of liquid pumped by a set of pumps associated with a sewage wet well or other liquid vessel.

BACKGROUND OF THE INVENTION

Such a pumped volume totalizer provides information that may be used for many purposes, including measuring and controlling the inflow to a sewage plant or measuring and reporting discharge of effluent. If the level in the vessel is measured by a continuous level measurement system, such as an ultrasonic level measuring device, then it is a simple matter to calculate the volume represented by changes in level as long as the shape of the vessel, and therefore the volume contained in the vessel at any particular liquid level is known. One simple technique is to measure a start level when a pump cycle begins as a pump control system turns on one or more pumps to pump liquid out of (or into) the vessel. When the level in the vessel has dropped (or risen) to a predetermined value, the pump control system turns the pumps off, at which point the level is again recorded, providing a stop level. The volume pumped is the difference between the calculated volume contained in the vessel at the start level and the calculated volume contained in the vessel at the stop level. This volume can then be made available for display or adding to a running total of volume pumped, or to control an external totalizing counter.

Such a system makes no allowance for any liquid flowing into or out of the vessel during the pump cycle other than through the pumps. The calculation assumes that any change in volume that occurs between the start and end of the pump cycle is entirely due to the action of the pumps. In a typical application, liquid may be flowing into (or out of) the vessel during the pump cycle; indeed, it will often be such a liquid flow which causes a change in level which initiates the pump cycle. Thus the actual amount pumped in such circumstances will be the amount calculated as above, plus the amount that has flowed into the vessel during the pump cycle.

In order to overcome this problem, it is known to measure the rate of change of level in the vessel that is occurring just prior to the start of the pump cycle. It is then assumed that the inflow during the pump cycle was continuous and at the same rate as the value recorded just prior to the start of the pump cycle. The calculated pumped volume is then adjusted by adding to it the assumed total volume that flowed into the vessel during the pump cycle.

Although widely used, the assumption upon which a system is based, i.e. that the rate of inflow remains constant during the pump cycle, is often unjustified. For example, in a system handling storm water, the rate of inflow may vary widely during the course of a storm in a manner such that the average rate of inflow during the time that the pumps were running differed widely from that existing when the pumps cycle started, leaving two substantial errors.

BRIEF SUMMARY OF THE INVENTION

The present invention seeks to address this problem by providing an alternative method of totalizing pumped volume. In the preferred embodiment, the present invention encompasses a method for totalizing volume of liquid pumped to or from a vessel by a set of pumps during a pumping cycle. The method comprises establishing a pumping rate for each pump in the set during the pumping cycle, determining a running time for which each pump was operated during the pumping cycle, determining for each pump a product of the pumping rate and the running time, and summing the products to provide a total for the volume of liquid pumped.

The present invention also encompasses a control system for controlling the pumping of liquid to or from a vessel with one or more pumps, said control system comprising: (a) a level sensor for determining the level of the liquid in the vessel and generating a liquid-level reading; (b) an actuator coupled to each of said pumps for turning the pump on and off, and said actuator having a control interface responsive to control signals; (c) a controller coupled to said level sensor and each of said actuators, and said controller having pump control means for controlling said pumps by issuing control signals to said control interfaces in response to said liquid level readings; (d) said controller having totalizing means for totalizing the volume of liquid pumped in said vessel, said totalizing means comprising: (i) means for recording when each of said pumps is turned on and off and calculating a running time for each of said pumps; (ii) means for determining a first rate of change of volume when each of said pumps is turned on and a second rate of change of volume a predetermined period after each of said pumps is turned on; (iii) means for determining a draw down rate for each of said pumps and means for calculating the volume pumped by each of said pumps based on the running time and draw down rate for each of said pumps; (iv) means for summing the volume pumped by each of said pumps to produce a total volume pumped for said vessel over the duration said pumps operated.

BRIEF DESCRIPTION OF THE DRAWINGS

Reference will now be made, by way of example, to the accompanying drawings which show a preferred embodiment of the present invention, and in which.

DETAILED DESCRIPTION OF THE PREFERRED EMBODIMENTS

Figure 1:
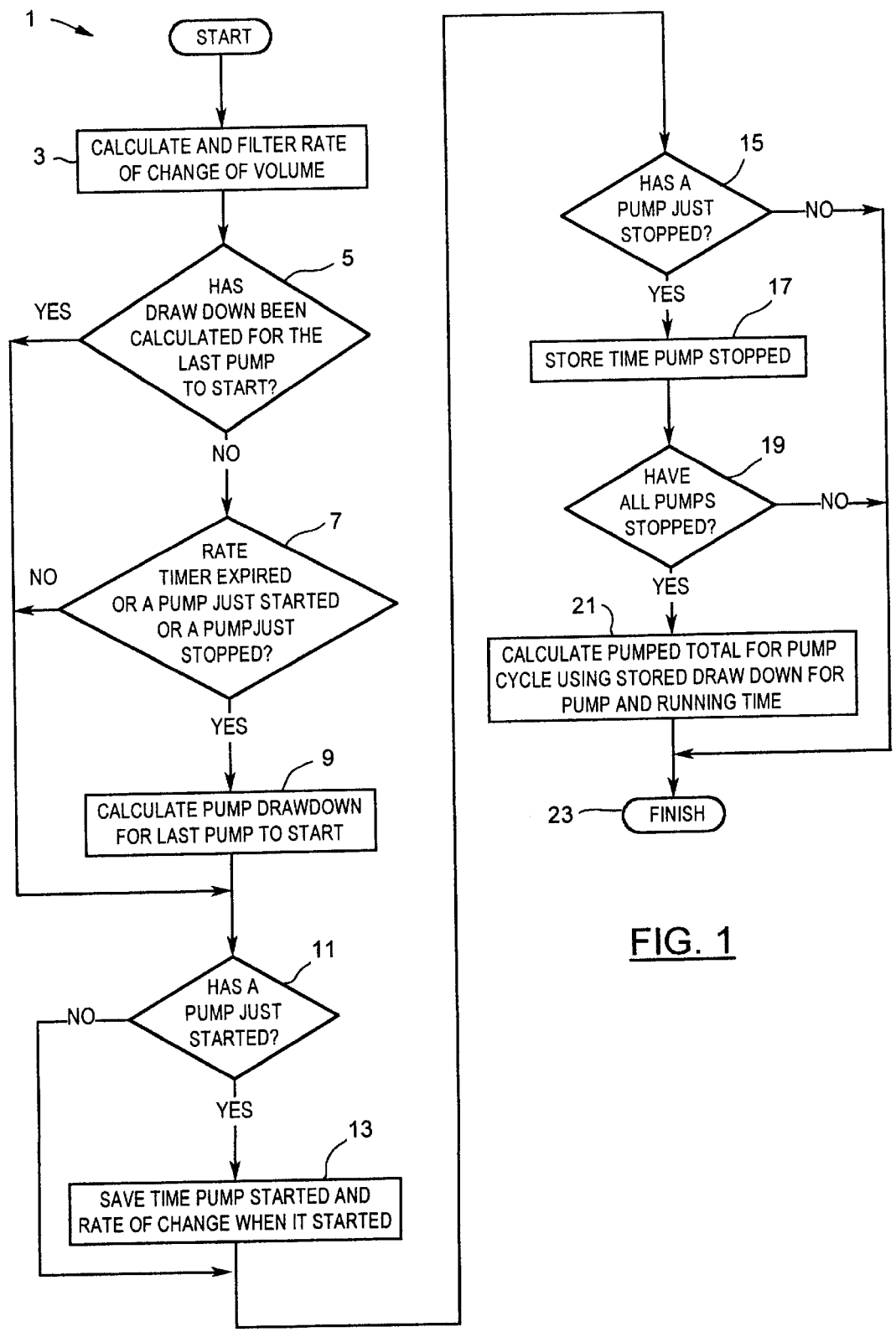
FIG. 1 in flow chart form a method according to the present invention.

The present invention provides a volume totalizing process or method for determining the total volume of liquid pumped from a vessel by one or more pumps during a pumping cycle. The pumping cycle is the time from the start of the first pump to the time the last pump is stopped. The method according to the invention is suitable for sewage wet wells or other liquid vessels. The volume pumped data is available for further use, such as measuring and controlling the inflow to a sewage plant or measuring and reporting discharge of effluent. In the following description, the method according to the present invention is described in the context of a "pump down" application, i.e. where flow into a vessel initiates a pump cycle to empty or "pump down" the liquid in the vessel, for example, a sewage wet well. It will be understood that the invention is also suitable for "pump up" applications where flow out of a vessel initiates a pump cycle to refill the vessel, for example, a municipal water supply system.

The method according to the present invention is implemented as a process and forms a module in a main process control program for controlling the pumps and liquid levels in a vessel. Such a process control program performs the following tasks:

(1) measuring and determining the level in the vessel using ultrasonic sensors or other suitable devices;

(2) turning control relays for the pumps ON or OFF according to programmed set points and the level measured by the ultrasonic sensors;

(3) calculating the volume in the vessel using the measured level;

(4) determining the pumped total volume according to the method of the present invention; and (5) updating displays and control (e.g. milliamp) outputs.

In a control process as described above, the method according to the present invention is performed on every measurement cycle after the volume in the vessel has been determined and the pump control relays have been turned ON or OFF according to the new measured level. The calculated volume for the vessel (obtained in step (3) above) is then combined with the volume measured on the previous cycle and the rate of change of volume with time is calculated. The rate of change of volume is processed or filtered to obtain an average rate of change of volume, for example, by calculating a running average. The filtered rate of change of volume is then stored in memory for use by the method according to the present invention as will now be described.

The volume totalizing method or process according to the present invention performs the following functions:

(1) every time a pump is started, the process stores the filtered rate of change value and the start time for the pump;

(2) the process also starts a timer to determine a time at which a second rate of change value is measured and stored;

(3) the second rate of change is calculated and stored when the time period expires or before the timer time-outs if another pump is started or the pump (or another pump) is stopped;

(4) every time a pump is stopped, the process saves the time at which the pump stopped.

When the last pump has stopped, the volume totalizing process will have calculated the draw down rate for each pump that ran during the cycle and the start and stop times for each pump that ran during the cycle. The draw down rate is calculated from the difference between the rate of change prior to a pump starting and the rate of change determined after the pump has started. Then at the end of the pumping cycle, the volume totalizing process calculates the pumped volume for each pump by taking the product of the draw down rate and the running time for the pump. The pumped volumes for all of the pumps are then summed to give the pumped total volume for the vessel for the pumping cycle, i.e. the time when the first pump started to the time the last pump stopped.

Reference is now made to FIG. 1 which shows the operation of a volume totalizing method 1 according to the present invention in more detail. As described above, the volume totalizing method 1 comprises a processing module which is called or invoked by the main process control program on each measurement cycle.

The first operation in the volume totalizing process and indicated by block 3 involves calculating the rate of change of volume for the vessel and preferably the rate of change of volume is filtered to obtain an average rate of change of volume. The filtering operation may comprise calculating a running average, or other known filtering method as will be understood by one skilled in the art.

Next in block 5, the volume totalizing method determines if the draw down rate for the last pump to start has been calculated. According to the invention, the draw down rate for a pump is calculated as the difference between the rate of change prior to the pump starting and a second rate of change taken after the pump has started. If the draw down rate for the last pump started hasn't been calculated, the volume totalizing method 1 proceeds to decision block 7 to determine if a second rate of change reading has been taken. The second rate of change reading is taken if one of the three events takes place: (1) the rate timer has expired; (2) a pump has just started; or (3) a pump has just stopped. If the rate timer has not timed out (or a pump started or stopped), then the second rate of change reading is not available for calculating the pump draw down rate in block 9 and control skips to block 11. If the draw down rate for the last pump to start has already been calculated (block 5), then the method also proceeds to decision block 11.

In decision block 11, the volume totalizing method 1 determines if a pump has just started. If a pump has started, the volume totalizing method 1 stores the time the pump started and the rate of change for the pump when it started block 13. (The rate of change is used to calculate the draw down rate for the pump as described above.)

The volume totalizing method 1 next checks if a pump has just stopped in block 15. If a pump has just stopped, the process stores the time the pump stopped in block 17. If no pump has stopped, the method 1 finishes and returns to the calling program, i.e. the main process control program.

In decision block 19, the volume totalizing process 1 determines if the pump which stopped in block 15 is the last of the pumps to stop. If all of the pumps have stopped, then the next step in block 21 of the process 1 involves calculating the total pumped volume for the pumping cycle. This operation involves calculating the pump volume for each pump by multiplying the draw down rate for the pump by the running time of the pump. The sum of all the pump volumes gives the total pumped volume for the vessel over the pump cycle. This value is stored in memory or returned to the main process control program in step 23.

The decisions relating to the starting of a pump (decision block 11) and the stopping of a pump (decision block 15) are implemented as operations in process 1 which checks flags stored in memory and set to Boolean values TRUE or FALSE (i.e. ON or OFF) corresponding to the state of each pump. The flags are set by the main process control program as the pumps are turned on or off.

The operation of the volume totalizing method according to the present invention is considered further in the context of a worked example. In this example, the vessel comprises a wet well which is cylindrical in shape, with a diameter of 3 meters and a depth of 5 meters. The wet well contains two pumps (Pump 1 and Pump 2) which are controlled by the main process control program. Pump 1 is turned ON when the level in the well reaches 3.5 meters from the bottom of the well. Pump 2 is turned ON when the level reaches 4.5 meters from the bottom of the well. When the level drops to 0.5 meters from the bottom of the wet well, both pumps are turned off. Each pump has the capacity to drop the liquid level at a rate of 0.3 meters/min. with no inflow. The rate timer is set to one minute on the basis that it takes approximately one minute after a pump (1 or 2) starts before the rate of change of level settles down to a steady value.

In the worked example, a storm begins and the level in the wet well begins to rise at a rate of 0.5 meters/minute. In accordance with the operation of the volume totalizing process or method, the following sequence of events operations occur as will be described with reference to the Table shown below.

TABLE

| Time (Min) | Level (Meter) | Volume (Meter³) | Rate (M³/Min) |
|---|---|---|---|
| 0 | 1.0 | 9.43 | — |
| 5 | 3.5 | 32.98 | 4.71 |
| 6 | 3.7 | 34.87 | 1.89 |
| 10 | 4.5 | 42.41 | 1.88 |
| 11 | 4.4 | 41.47 | −0.94 |
| 31 | 2.4 | 22.61 | −0.94 |
| 34.17 | 0.5 | 4.71 | −5.64 |

At time =0 minutes, the storm begins and the level begins to rise in the well at a rate of 0.5 meters/minute. By time =5 minutes, the level has risen to 3.5 meters and Pump 1 is turned ON. The main process control program calls the volume totalizing process 1 at the measurement cycle and the start of Pump 1 is detected by the volume totalizing process 1 at decision step 11 (FIG. 1(i)) and the start time for Pump 1 and rate of change when Pump 1 started are saved (step 13 in FIG. 1(i)). The rate of change for Pump 1 is calculated on the next pass through the volume totalizing process 1 at step z5. The rate of change is determined by taking the difference between the volumes at times 0 minutes and 5 minutes and dividing by the time, i.e. 5 minutes, to give a rate of change =4.71 m³/min. (As described above the rate of change values may be filtered, but in this example, they are not.)

One minute later at time =6 minutes, the rate timer times out (step 7—FIG. 1(i)) and the draw down rate for Pump 1 is calculated (step 9—FIG. 1(i)). The draw down rate is calculated by taking the difference between the rate of change of volume when Pump 1 was started (stored previously in memory) and the rate of change of volume which is determined when the rate timer expires, or a pump is started or stopped (step 7 in FIG. 1(i)). The rate of change at time =6 minutes is (34.87 −32.98)/1 min =1.89 m³/min, and this value is stored in memory.

The draw down rate for Pump 1 is then calculated (step 9—FIG. 1(i)) by taking the difference between the rate of change values at times 5 and 6 minutes, i.e. DRAW DOWN RATE =1.89 m³/min −4.71 m³/min =−2.82 m³/min. The negative draw down rate for Pump 1 indicates that the liquid level is decreasing in the wet well, i.e. by definition pump draw down rate is the rate of change of volume that would occur if the pump was operating alone with no inflow. Thus, the pump draw down rate will be negative in a "pump down" application.

The level continues to rise and at time =10 minutes, the level has reached 4.5 meters and the process control program turns ON Pump 2. The volume totalizing process 1 is again called during the measurement cycle. The totalizing process 1 calculates the rate of change (step 3—FIG. 1(i)) at the time Pump 2 started as (42.41 −34.87) m³/4 min =1. 88 m³/min. Next at step 5, the process 1 determines that the draw down rate has not been calculated and moves to step 7 which checks the rate timer. When the rate timer has expired, i.e. at time =11 minutes, the draw down rate is calculated by first determining the rate of change at time =11 minutes. The rate of change is (41.47 −42.41) m³/1 min =−0.94 m³/min. The draw down rate for Pump 2 is then given by the difference −0.94 −1.88 =−2.82 m³/min. The rate of change becomes negative because the combined draw down of Pumps 1 and 2 now exceeds the inflow.

The storm continues until time =31 minutes and both Pump 1 and Pump 2 continue to operate removing liquid from the wet well until at time =34.17 minutes the level in the wet well drops to 0.5 meters. At this time, the main process control program turns OFF both Pump 1 and Pump 2, and the stopping of the pump(s) is detected by the volume totalizing process 1 at step 15 (FIG. 1(ii)). As a result of the pumps being stopped, the time (i.e. 34.17 minutes) is stored in memory in step 17 (FIG. 1(ii)). Because all the pumps, i.e. both Pump 1 and Pump 2, have been stopped (step 19—FIG. 1(ii)), the pumped total volume for the pumping cycle is calculated next in step 21. The total volume is calculated by summing the total volume pumped by each of the pumps. For Pump 1, the total volume pumped is calculated as the product of the draw down rate for Pump 1 multiplied by the running time for Pump 1 and is Running Time =34.17−5=29.17 minutes Total Volume Pumped by Pump 1=29.17×2.82=82.26 m³

Similarly, for Pump 2, the total volume pumped is calculated as follows,

Running Time (Pump 2)=34.17−10=24.17 minutes

Total Volume Pumped (Pump 2)=24.17×2.82=68.16 m³ and,

TOTAL VOLUME PUMPED DURING CYCLE= VOLUME (PUMP 1)+VOLUME (PUMP 2) +. . . VOLUME (PUMP ON)

=82.26+68.16

=150.41 m³

One of the advantages of the method according to the present invention is that total volume pumped is determined without the need to know the exact rate of inflow into the wet well.

Figure 2:
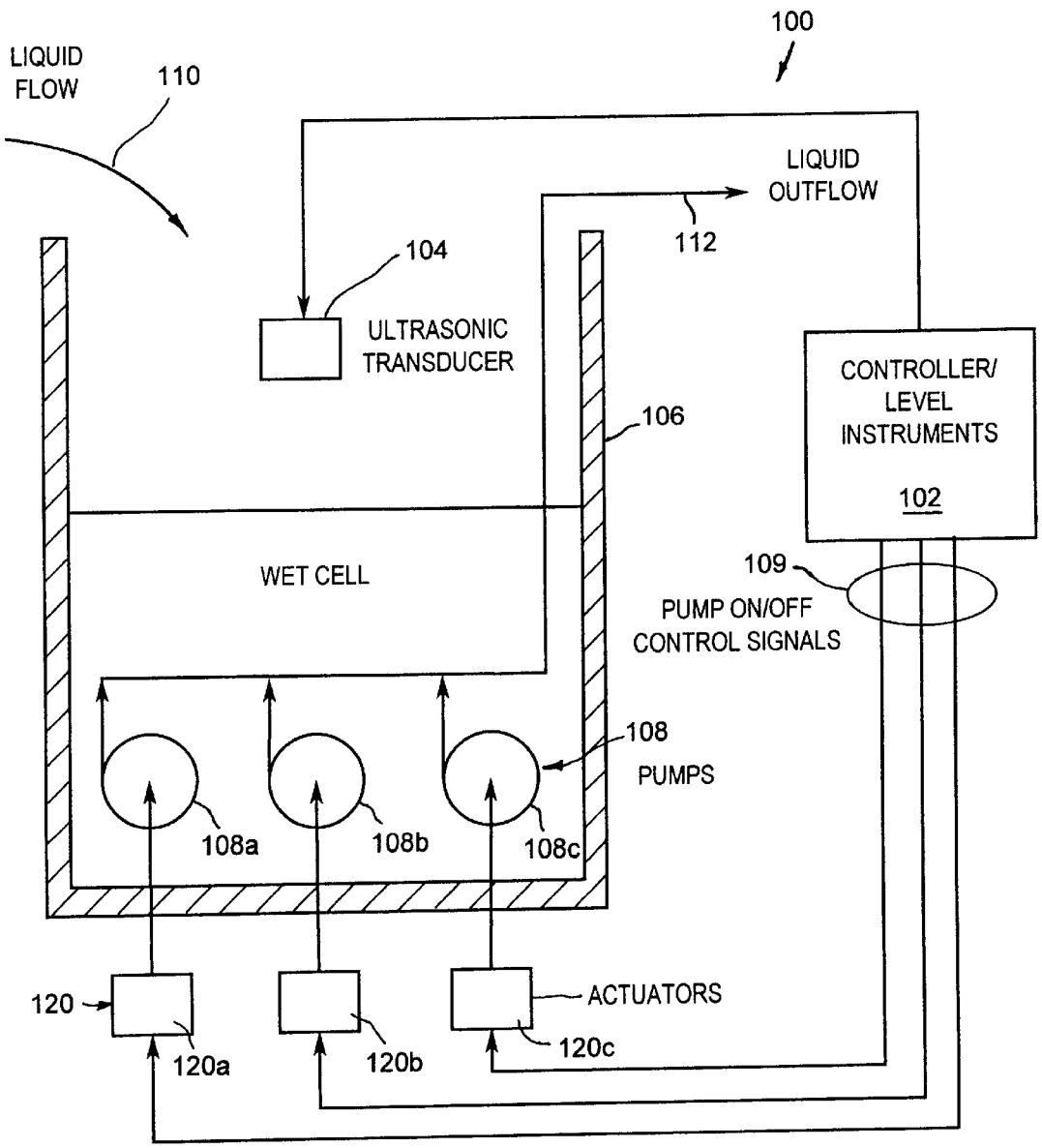
FIG. 2 shows in block diagram form a control system for performing the method according to the present invention.

Reference is next made to FIG. 2 which shows in block diagram form a control system 100 for performing the method according to the present invention. As shown, the control system 100 comprises a controller/level instrument 102 and a level sensor 104. The level sensor 104 which may comprise an ultrasonic transducer sensor provides liquid level measurements to the controller 102 for a wet well or other vessel containing a liquid and indicated generally by 106. The level of the liquid in the wet well 106 is controlled by one or more pumps 108, shown individually as 108*a*, 108*b* and 108*c* in FIG. 2. As shown in FIG. 2, the pumps 108 receive control signals 109 through actuators 120*a*, 120*b*, 120*c*, i.e. pump on/off signals, from the controller 102. Liquid inflow to the well 106 is represented generally by 110, and liquid outflow from the well 106 is represented generally by 112. The controller/level instrument 102 preferably includes a microprocessor (not shown) which is suitably programmed to perform the method according to the present invention as described above, the implementation details of which are within the understanding of one skilled in the art. In addition, the controller 102 includes the functionality for performing conventional level measurement operations.

The present invention may be embodied in other specific forms without departing from the spirit or essential characteristics thereof. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method for totalizing volume of liquid pumped to or from a vessel by a set of pumps during a pumping cycle, wherein the pumping cycle is the time from the start of the first pump in the set to the time the last pump in the set is stopped, said method comprising:

establishing a pumping rate for each pump in the set after the pump is started and before the pump is stopped;

determining the running time for which each pump in the set was operated during the pumping cycle; and summing the products for each pump in the set of its pumping rate and its running time.

2. The method as recited in claim 1, wherein said step of establishing a pumping rate for each pump comprises: determining the rate of change of volume for the vessel prior to starting the pump, determining the rate of change of volume for the vessel after starting the pump, and taking the difference between the rate of change before and after the pump started as the pumping rate for the pump.

3. The method as recited in claim 2, wherein the rate of change of the volume is taken a predetermined time after the pump is started.

4. A control system for controlling the pumping of liquid to or from a vessel with one or more pumps, said control system comprising:

(a) a level sensor for determining the level of the liquid in the vessel and generating a liquid level reading;

(b) an actuator coupled to each of said pumps for turning the pump on and off, and said actuator having a control interface responsive to control signals;

(c) a controller coupled to said level sensor and each of said actuators, and said controller having pump control means for controlling said pumps by issuing control signals to said control interfaces in response to said liquid level readings;

(d) said controller having totalizing means for totalizing the volume of liquid pumped in said vessel, said totalizing means comprising:

(i) means for recording when each of said pumps is turned on and off and calculating a running time for each of said pumps;

(ii) means for determining a first rate of change of volume when each of said pumps is turned on and a second rate of change of volume a predetermined period after each of said pumps is turned on and before each of said pumps is turned off;

(iii) means for determining a draw down rate for each of said pumps and means for calculating the volume pumped by each of said pumps based on the running time and draw down rate for each of said pumps;

(iv) means for summing the volume pumped by each of said pumps to produce a total volume pumped for said vessel over the duration said pumps operated.

* * * * *